United States Patent

[11] 3,601,672

| | | | | |
|---|---|---|---|---|
| [72] | Inventor | Edward A. Horsley Niagara Falls, Ontario, Canada | 3,123,756 3/1964 Horsley | 318/209 |
| [21] | Appl. No. | 847,894 | 3,312,886 4/1967 Mitchell | 318/204 |
| [22] | Filed | Aug. 6, 1969 | | |
| [45] | Patented | Aug. 24, 1971 | Primary Examiner—Oris L. Rader | |
| [73] | Assignee | Dominion Bridge Company Limited | Assistant Examiner—Robert J. Hickey Attorney—Hill, Sherman, Meroni, Gross & Simpson | |

[54] EDDY CURRENT BRAKING SYSTEM
9 Claims, 3 Drawing Figs.

[52] U.S. Cl............................................ 318/204,
318/209, 318/382
[51] Int. Cl........................................... B66d 5/02
[50] Field of Search.......................... 318/204,
209, 212, 382, 48, 46, 203, 362

[56] References Cited
UNITED STATES PATENTS
2,963,634 12/1960 Cortelli et al................ 318/302 X

ABSTRACT: An eddy current braking system for wound rotor induction motors, particularly those employed in hoisting and lowering loads, employs apparatus for sensing reflected load torque and speed and utilizing a signal derived therefrom for controlling braking of the motor. The control signal is only a small fraction of and represents a large current in the motor circuit. System stability to negate hunting of the eddy current brake is provided by a feedback circuit connected between the exciting winding of the eddy current brake and the control input to a solid state firing circuit.

INVENTOR.
EDWARD A. HORSLEY

EDDY CURRENT BRAKING SYSTEM

BACKGROUND OF THE INVENTION

1. Field of the Invention

This invention relates to control systems for a wound rotor induction motor and, more particularly, to a control system that has an artificial load, such as an eddy current brake, coupled to the induction motor and means to vary the braking force applied to the artificial load wherein the current supplied to the eddy current braking system is a function of the torque reflected by the load.

2. Description of the Prior Art

This application discloses an improvement in an eddy current braking system over prior systems, including that disclosed in my U.S. Pat. No. 3,123,756, wherein an eddy current braking system is provided for automatically braking the effects of a load of an induction motor, particularly when used in hoisting and lowering operations. In my patent I set forth the principles for the operation of polyphase induction motors wherein such motors are usually employed to handle crane hoisting operations. In such applications, a variable resistance circuit is connected in the motor winding circuit of the motor to vary the speed and the torque output of the hoist motor, and artificial loads are coupled to the induction motor to provide a braking force when a load is being lowered. An artificial load commonly employed is an eddy current brake which utilizes a rotary member coupled to the rotor of the induction motor and an exciting winding connected to an electric potential source.

The eddy current brake is excited by constant voltage selected to provide adequate torque for the safe lowering of loads and produces excessive torque when light loads are being lowered so that considerable motor torque must be provided to give an adequate lowering speed for the light loads. Large motor torque results in unnecessary heating of both the motor and the brake. The utilization of increased brake excitation to provide additional braking torque is required for safe lowering of an excessive load, or overload, and automatic reduction of excitation for light loads permits the lowering of heavy loads and the desired speeds of light loads to be obtained with a reduction in motor torque. Variable excitation permits the use of a smaller brake in some instances.

As stated in my above-mentioned patent, various methods have been employed to produce the desired variations of eddy current brake excitation, however, up until that time, all such excitations attempted to relate the speed of the motor to the excitation of the eddy current brake. Devices commonly used up to that point to perform this function were self-saturating magnetic amplifiers and saturable reactor-type magnetic amplifiers. Each of these devices have definite limitations in their application to crane hoist work. The self-saturating magnetic amplifiers are complicated to control and very costly for such operations. The saturable reactor magnetic amplifier is less costly but, of course, introduces rather serious time delays in response to control signal changes which result in an overshoot or undershoot from the desired speed of changes. Furthermore, while the saturable reactor amplifier is less costly than the self-saturating magnetic amplifier, the saturable reactor amplifier is still an expensive item, particularly if it is sized to produce the most desirable degree of motor unloading. My aforementioned patent therefore sets forth a novel and improved eddy current braking system which was relatively inexpensive in comparison to prior art control systems, and which are simple in construction and dependable in operation, and which operate with measurable time constants and was effective to reduce unnecessary brake, heating and motor heating.

While braking systems constructed in accordance with the teachings of my aforementioned patent are desirable and provide relatively inexpensive electrical control apparatus for braking a wound rotor induction motor by means of eddy current braking techniques, it is also desirable to provide an eddy current braking system having, in addition to the aforementioned advantages, the additional advantage of providing a control current for eddy current braking system in which such control current is proportional to, but only a small fraction of, the rotor current of the induction motor, and to provide a control that will produce a more uniform speed for each point on the controller regardless of the magnitude of the load being handled.

SUMMARY OF THE INVENTION

Accordingly to the invention, an eddy current braking system is provided for a wound rotor induction motor, which braking system is automatically operable to control motor braking in response to control current signals which are small fractions of, and represent, rotor current. Excitation of the eddy current brake winding is provided by gating and rectifying a single phase line voltage to the winding under the control of a firing circuit. Said firing circuit regulates the output of a conventional silcon-controlled rectifier or thyristor full-wave bridge. The aforementioned control current is derived from rotor current, as compared to a reference signal, and controls the operation of the firing circuit which in turn regulates the output of the thyristor bridge. An antihunt feedback circuit is provided between the brake winding and the input to the firing circuit to stabilize brake operation.

BRIEF DESCRIPTION OF THE DRAWINGS

Other objects, features and advantages of the invention, its organization, construction and operation will be readily apparent from the following description of a preferred embodiment thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
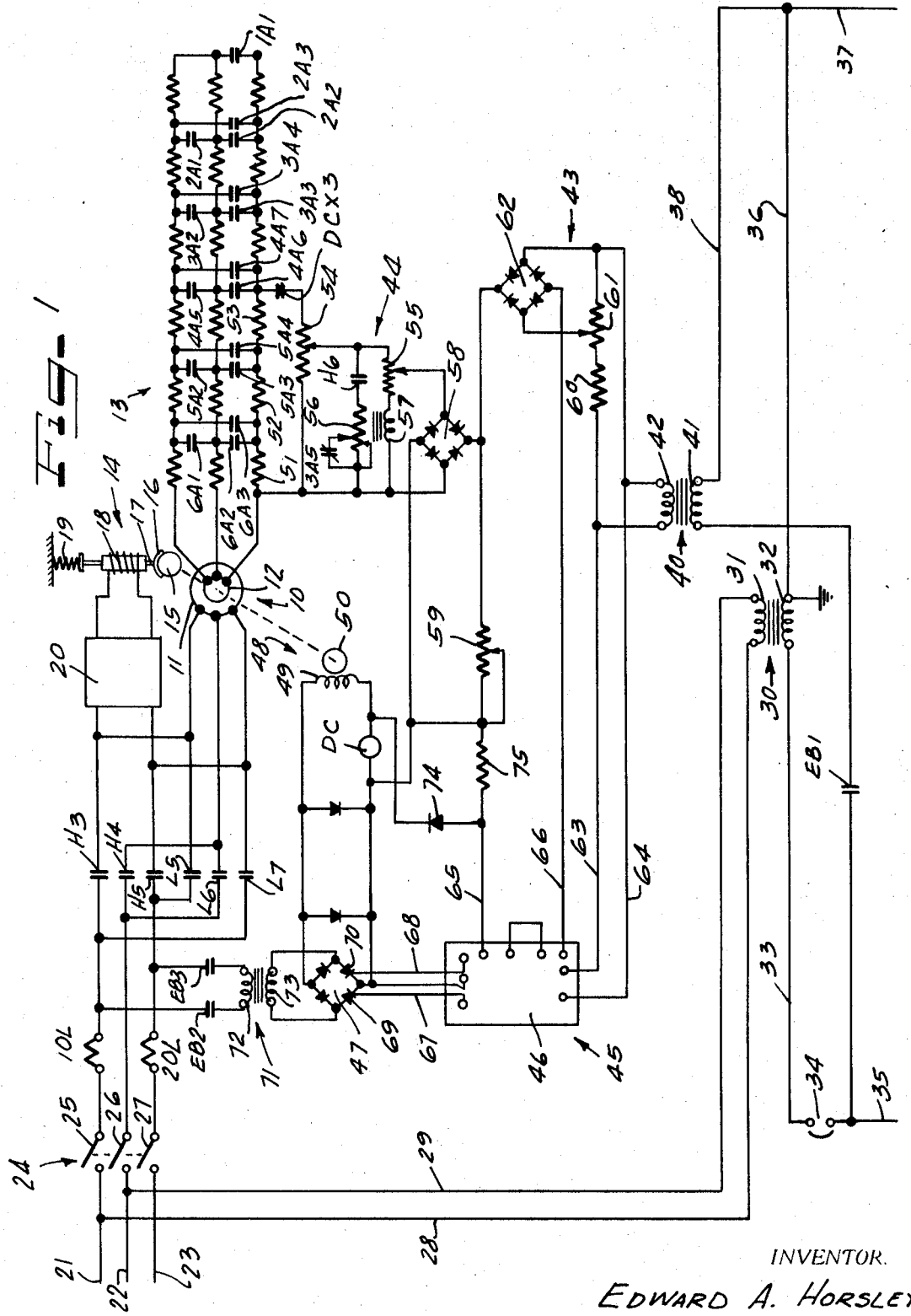
FIG. 1 and FIG. 2 joined together in accordance with FIG. 3 provide a schematic diagram of an eddy current braking system constructed in accordance with the principles of the present invention, FIG. 3 being found on the same sheet of drawings as FIG. 2.

In the drawings, there is illustrated a wound rotor induction motor 10 having a primary winding 11 connected to a power supply circuit and a rotor winding 12 connected to a variable resistance accelerating circuit 13. A conventional magnetically controlled friction brake 14 is mechanically coupled to the rotor 12 of motor 10 and an eddy current brake 48 has its winding 49 in its fixed stator and its rotor 50 mechanically coupled to the rotor 12 of motor 10. The eddy current braking circuit (40-54-72-49) is electrically coupled to the power supply and magnetically coupled to the rotor 50 of the eddy current brake.

The power supply circuit includes three conductors 21, 22 and 23 which are connected in operation to suitable polyphase alternating current source, a switch 24 and two sets of relay contacts H3—H5 L5—L7. The connection of conductors 21, 22 and 23 to the primary winding 11 of motor 10 is such that when contacts H3—H5 are closed, the motor 10 is driven in a first direction, the hoisting direction, and when the contacts L5—L7 are closed the motor is driven in the opposite or lowering direction.

The magnetic brake 14 is a conventional DC type brake that is connected to apply braking force only when it is not energized by an electric current. This brake includes a brakedrum 15 and a brakeshoe 16 mechanically coupled to the plunger 17 or solenoid having an operating winding 18. The operating winding of the solenoid is connected through a rectifier 20 and contacts H3 and H5 or contacts L5 and L7 to the power supply. A compression spring 19 is positioned between a stationary barrier and the plunger 17 of the solenoid to normally urge the brake shoe 16 against the brakedrum 15.

The accelerating circuit 13 for the rotor winding 12 includes a plurality of resistors which are included or excluded as operational components of the accelerating circuit by way of plurality of relay contacts 1A1—6A3. The accelerating circuit 13 also includes resistances 51, 52 and 53 as a portion of the rotor current sensing circuit 44 which are selected and proportioned to provide balanced WYE operation in the rotor circuit. The value of resistors 51—53 is proportioned with respect to individual motor characteristic and a minute portion of the current in this phase is converted to a direct current voltage by the rectifier 58, rather than all the rotor current of this phase being provided as a direct current control signal as in my aforementioned patent.

Figures 2, 3:
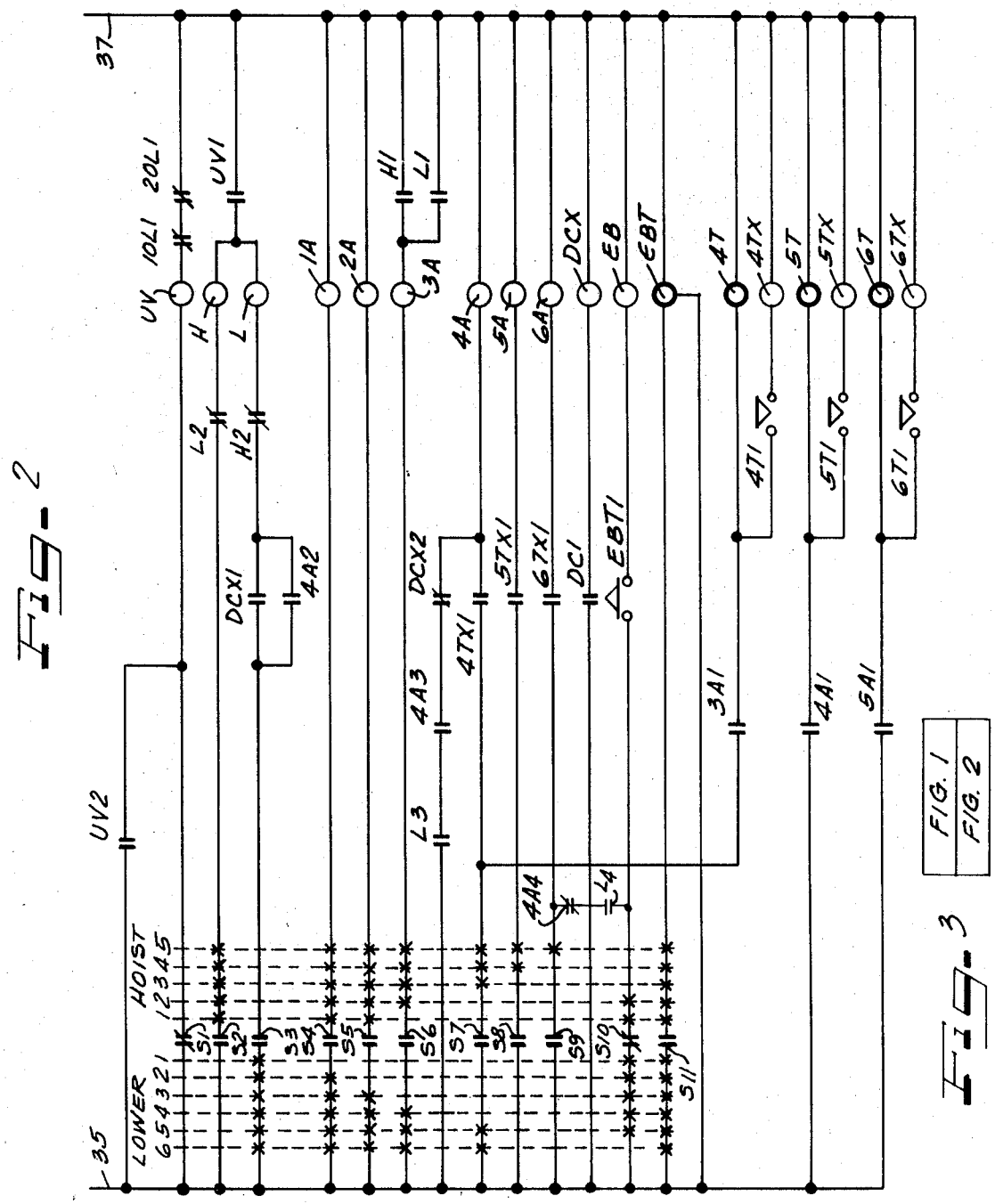

The system includes a single phase transformer 30 having a primary winding 31 connected to one phase of the power supply by way of conductors 28 and 29. The secondary winding 32 of transformer 30 is connected by way of conductor 33, switch 34, conductor 35 and conductors 36 and 37 to the motor controlling circuit illustrated in FIG. 2. The motor controlling circuit of FIG. 2 is therefore provided with an operated by, according to this preferred embodiment, a single phase of polyphase power supply for controlling the inclusion and exclusion of resistors in the rotor circuit and the operation of the motor and the magnetic and eddy current brakes.

Attention is invited that the eddy current braking circuit includes three separate alternating current inputs. The first of these inputs is by way of power supply conductors 21 and 22, conductors 28 and 29, transformer 30, conductors 33, 36 and 38, switch 34, relay contact EBI and constant voltage transformer 40. The second of these inputs is by way of the sensing circuit 44 which derives a portion of the input signal to the firing circuit 46. The third circuit input is by way of transformer 71 having an input winding 72 which is connectable to a single phase of the polyphase input represented by conductors 21 and 23 via relay contacts EB2 and EB3 and switch 24.

More specifically, the first alternating current input is effective to supply a constant operating voltage to the firing circuit 46 over conductors 63 and 64, and to supply a constant reference potential to rectifier 62 by way of resistors 60 and 61, upon manual operation of switch 34 and closure of relay contact EB1. Operation of switch 34 provides operating potentials for the motor controller, relays and timers illustrated in FIG. 2.

The second alternating current input is derived from the accelerating circuit 13, particularly across resistors 51—53. The voltage sensed across these resistors, or a fraction thereof, is provided to full-wave rectifier 58 by way of relay contact DCX3 and resistors 54 and 55. Resistor 54 provides for an infinitely adjustable voltage as a percentage of the voltage appearing in the rotor circuit across resistor 51—53. The adjustment provided by this resistor allows standardization of regulating circuit components in spite of variations in motor rotor characteristics due to various horsepowers for instance, and the voltage here derived is directly proportional to rotor current and, hence, to rotor torque. Resistor 55 is employed to provide an adjustment of the effect on machine performance provided by the reactor 57 which bypasses some of the input from the sensing circuit around the full-wave reset rectifier 58. With the pointer on resistor 55 moved to the right in the illustration the reactor has minimum effect on the proportion of sensed voltage supplied to the full-wave reset rectifier. With the pointer at the opposite end of the resistor the reactor has a maximum effect. The impedance of reactor 57 is proportioned to pass very little current at line frequency which is present in the motor rotor at standstill and a relatively large current at the very low frequency present in the motor rotor near synchronous speed. Thus the reactor can be used to adjust the level of sensed voltage from a given amount of rotor current as a function of motor speed.

The adjustment of resistors 54 and 55 together with the effect of the reactor 57 forms an important part of this invention. The movement of the pointer on resistor 54 to the right will increase the sensed voltage for any level of rotor current on all points of the control using the eddy current brake, and thereby increase the motor speed for all of these points. The movement of the pointer of resistor 54 to the left will create the opposite condition and reduce the speed on all said points. However, as already mentioned the reactor 57 has a minimum effect of slow speeds and a maximum effect at high speeds, therefore an adjustment of the pointer on resistor 55 to the left will increase the speed of the higher speed points without significantly effecting the lower speed points, while moving the pointer on resistor 55 to the right will produce the opposite effect and slow the motor on the higher speed points without significantly effecting slow speed performance. To summarize resistor 54 allows the adjusting of all speed points while resistor 55 provides an adjustment of the spread below various speed points.

The signal sensed, modified, and then rectified by rectifier 58, hereinafter called the reset voltage, is applied across resistor 59 for deriving a control current for the firing circuit 46. Resistor 59 serves two functions. First, it is employed to set the level of control current provided to the thyristor firing circuit and, hence the maximum eddy current brake excitation. At any preset reference voltage and with no rotor current flowing, this resistor is set to provide the eddy current brake excitation for a specific machine, or to allow a maximum of, for example, 0.0007 amperes control current to flow as a control input to the firing unit. Secondly, resistor 59 also carries reset current as rectified by the reset rectifier 58. This reset current produces a proportional voltage drop across resistor 59 which opposes a reference voltage delivered from the reference rectifier 62. Control current flowing is therefore a function of the difference between the reference voltage and the reset voltage.

At this point it should be noted that the firing circuit 46 may be one of several well-known types. For example, an FC-100 single phase firing circuit manufactured by International Rectifier Corporation has proven to be extremely satisfactory in a working embodiment of this invention.

The low level of current required to control this type of unit allows resistors 54, 55, 56, 75 and 59 to be very low wattage, small-sized, inexpensive potentiometers and, a typical rating would be 5—10 watts.

Resistors 60 and 61 provide a voltage divider across the output of constant potential transformer 40. These resistors provide an adjustable voltage source for the reference rectifier 62.

With an alternating input supplied over conductors 63 and 64 and a control current flowing in the loop including conductors 65 and 66, the firing circuit operates to provide gating pulses on conductors 67 and 68 to controlled rectifiers (thyristors) 69 and 70 of full-wave rectifier 47. Assuming contacts EB2 and EB3 are closed, a single phase alternating current signal is therefore provided by transformer 71 to full-wave rectifier 47 for gating and rectification to the excitation winding 49 of the eddy current brake 48. As previously mentioned, maximum eddy current brake excitation is provided upon sensing no rotor current flow. The firing circuit is thereby operating to allow the rectification of virtually all of the alternating current voltage provided by transformer 73. As torque and rotor current increase the reset voltage increases, control current through wires 65 and 66 decreases and the firing circuit operates to allow the rectification of only a part of each cycle of the alternating current voltage provided by transformer 73. Eddy current brake excitation is thereby reduced to a preset value. As mentioned before, the firing circuit 46 is an extremely sensitive device taking, for example, 0.0007 amperes in wires 65—67 to produce full output of the controlled rectifier and conversely in the unit mentioned a reduction of said control current to 0.0002 amperes will reduce the rectifier output to zero. The combination of this great sensitivity with the relative large electrical inertia of the eddy current brake tends to produce an unstable condition and therefore an antihunt feed back system is provided by way of diode 74 and resistor 75. Resistor 75 is a relatively low ohmic value resistor which is provided to develop a negative feedback voltage in the firing unit control circuit. This negative feedback voltage is effective to quickly stabilize the system at all times after a change in excitation has been requested.

To provide a more complete appreciation of the eddy current braking system of the present invention, its application with respect to hoisting and lowering will be discussed to a certain extent.

The switches for manually controlling hoisting and lowering operations may take any of several forms, however, the usual cam-operated master control is illustrated in FIG. 2. The master control includes contacts S1—S11, S1 and S10 of which are normally closed as indicated by the diagonal lines therethrough. The small "x's" across the conductors at the particular hoisting and lowering positions of the controller indicate positions in which the corresponding contacts assume a closed position in other than the off position. In the off point a circuit is completed for the operation of relay UV, to close contacts UV1 and UV2. Contacts UV2 provide a holding circuit for relay UV and contacts UV1 prepare a circuit for the operation of the hoisting or lowering relays H and L, respectively.

Movement of the controller to the first hoist position causes contacts S2 to close and complete an operating circuit for relay H via contacts S2, L2 and UV1. Contacts H3—H5 close to provide hoisting energization to primary winding 11 of motor 10. Contact H6 closes to provide modification of the sensed reset signal by resistor 56 over a path including contacts H6 and the right hand pointer of resistor 56, contact 3A5 having remained closed. This recalibration of the reset circuit in the hoisting direction is necessary because the motor must now produce sufficient torque to lift a heavy load and the larger current in the rotor circuit at this time would swamp the reset circuit otherwise calibrated for lowering conditions. The extreme sensitivity of the regulating circuit allows a most important advantage in the hoisting mode. A large reset signal will greatly reduce the excitation of the eddy current brake and thereby make most of the motor torque available to hoist the load; on the other hand, if a light load or empty hook condition exists, then the motor will attempt to increase in speed. The drop in rotor current created by this increase in speed results in a reduction in reset current and an increase in the excitation of the eddy current brake. This action therefore limits the increase in speed and provides very desirable first point manipulation. The left-hand pointer on resistor 56 provides an adjustment of this speed point. In this position relays 1A and 2A are also operated by way of contacts S4 and S5, respectively, to control the motor speed by closing contacts 1A1, 2A1, 2A2 and 2A3.

Also, in the first hoisting position the eddy current brake timer EBT has operation thereof initiated by way of contacts S11. Contacts EBT1 close instantly, the upright triangle thereon indicating that this contact will be delayed in opening when contacts S11 are again opened in the off position. Contacts EBT1 provides an energizing path for relay EB over contacts S10. Upon operation of relay EB contacts EB1 close making the constant voltage transformer 40 effective as an input to the eddy current braking system, and contacts EB2 and EB3 close to provide a single phase of alternating current to be gated by the thyristor bridge under control of the firing circuit. When eddy current brake current flows through winding 49 it must pass through a current sensing relay DC which is calibrated to pick up at a preset value. Contacts DC1 then provides an energizing path for relay DCX this being a contact multiplier for this function. Contacts DCX3 close to provide reset voltage only after the basic eddy current brake excitation has been established.

Movement of the controller to the second hoist position closes contacts S6 to operate relay 3A by way of contacts S6 and H1. Contacts 3A2, 3A3 and 3A4 close to increase the speed of the motor by reducing the resistance of the acceleration circuit 13. Contacts 3A5 open to provide individual adjustment of reset voltage on this point by the movement of the left-hand pointer of resistor 56. In the movement of the master controller to positions 3, 4 and 5 the eddy current brake is disconnected by opening of contacts S10 and the deenergization of relay EB and opening of its contacts EB2 and EB3. In these points the motor performs as any conventional wound rotor hoist motor. On returning the master switch through points one and two the eddy current brake is again energized and is maintained and operated in the "off" position by virtue of the time delay provided by the delayed opening of contacts EBT1 mentioned above. This action allows the eddy current brake to assist the magnetic friction brake in arresting the rotating mass and provides an overlap of the action of the two brakes to prevent load drop due to the time constant of the magnetic brake. In the lowering operation torque produced by the hook load and by the motor in total are opposed by the torque of the eddy current brake. Since contact H6 does not close in the lowering direction the reset voltage provided to rectifier 58 is adjusted solely by resistor 54 and 55. With the motor driving in the downward direction and restricted by the eddy current brake it is most desirable to operate both the motor and the eddy current brake at low torque to reduce unwanted heating of both devices. However, it must be recognized that any hook load also produces a downward torque on the eddy current brake and the current sensing and reset circuit immediately responds to any increase in speed created by this additional downward torque and automatically adjusts the level of eddy current brake excitation to maintain stability and limit the increase in speed created by normal loads within nominal limits. In the lowering direction the operation of the master controller, contactors and eddy current brake circuit is similar to that described in hoist except for recalibration of the reset circuit and the motor acceleration circuit. It should be noted however that there are shown 5 points of subsynchronous lowering control using the eddy current brake and that in the 6th point lower the eddy current brake is disconnected by contact S11 dropping out contactor EB. This produces close to synchronous speed for an empty hook and supersynchronous speed, with the design limits of the motor used, for heavier loads.

As a safety precaution a direct current series relay DC is provided in the eddy current brake excitation circuit. In the lowering direction this relay prevents the operation of the lower contactor until a suitable level of excitation current is present. This is accomplished by contact DCX1 being a multiplier on relay DC as mentioned above. This relay also functions to prevent a dangerous increase in rotor resistance when the master controller is moved from the 6th or regenerative lowering point to any other lowering point until a suitable level of eddy current brake excitation is present. This is accomplished by the circuit through contacts L3, 4A3 and DCX2 the latter being normally closed. This circuit functions to maintain contactor 4A in the operated condition regardless of master switch operation until relay DCX operates as a slave on relay DC.

Although not specifically illustrated, the system may also include fuses, lockout circuits, etc. as are usually employed in such equipment.

Generally then there has been described an eddy current braking system for a motor of the wound rotor type wherein maximum eddy current braking is provided as a reference amount of braking, the reference being related to zero rotor current and zero torque conditions. Modification of the amount of braking supplied is provided by sensing a small percentage of actual rotor current and providing a current indicative of the actual condition in opposition to the reference current which provides for maximum braking. The difference between these two currents is provided as a control signal to a firing circuit which gates an alternating current for rectification as the braking potential applied to the excitation winding of an eddy current brake.

The embodiments of the invention in which an exclusive property or privilege is claimed are defined as follows:

1. A braking system for a wound rotor motor that has a primary winding and a rotor winding, comprising: a brake adapted to be coupled to said motor including an exciting winding for receiving brake exciting current; and means for providing brake exciting current including impedance means connected in circuit with said rotor winding for developing a first signal as a function of the torque on said motor, said impedance means comprising first variable resistance means connected in circuit with said rotor winding and adjustable to vary the speed of the motor, sampling means connected to said variable resistance means for determining the current in the rotor circuit including second variable resistance means for developing a sample signal in direct proportion to the rotor current, an impedance device connected to said second variable resistance means and having an inductive impedance value that is proportional to motor speed for modifying the sample signal to provide said first signal as a function of rotor current and rotor speed, reference circuit means for establishing a reference signal in opposition to said first signal; and brake exciting means connected to said exciting winding and operable in response to the difference between said first and reference signals to provide brake exciting current to said brake exciting winding, said brake exciting means comprising a gating circuit for connecting said exciting winding to a power supply in response to gating pulses and firing means connected to said gating circuit and operable to generate pulses in response to the difference between said first and reference signals.

2. The braking system according to claim 1, wherein said system further comprises means for operating said motor at a first plurality of slow speeds and a second plurality of high speeds, and said impedance means comprises means operable to adjust the first and second pluralities of speeds independently of one another.

3. The braking system according to claim 1, comprising a feedback circuit connected between said exciting winding and said brake exciting current providing means for stabilizing the energization of said exciting winding effected by said firing means upon changes in excitation of said exciting winding.

4. The braking system according to claim 3, wherein said feedback circuit comprises a diode having its cathode connected to said exciting winding and its anode connected to said firing means, and a resistor connected to said diode for developing a feedback signal in proportion to the excitation of said exciting winding.

5. The braking system according to claim 1, wherein said reference circuit means comprises a constant voltage transformer having a primary winding for connection to an electrical supply and a secondary winding, and rectifying means connected to said secondary winding for providing a reference current to said firing means.

6. The braking system according to claim 5, wherein said reference circuit means further includes means connected to said secondary winding for adjusting the level of said reference current.

7. The braking system according to claim 1, wherein said impedance means and said reference signal means each include rectifying means for providing said first and reference currents as opposed direct currents.

8. The braking system according to claim 1, wherein said reference circuit includes a full-wave rectifier for connection to a single phase electrical supply.

9. The braking system according to claim 8, wherein said reference circuit further includes constant potential transformer, and an adjustable voltage divider connected between said constant voltage transformer and said full-wave rectifier.